Figure 1:
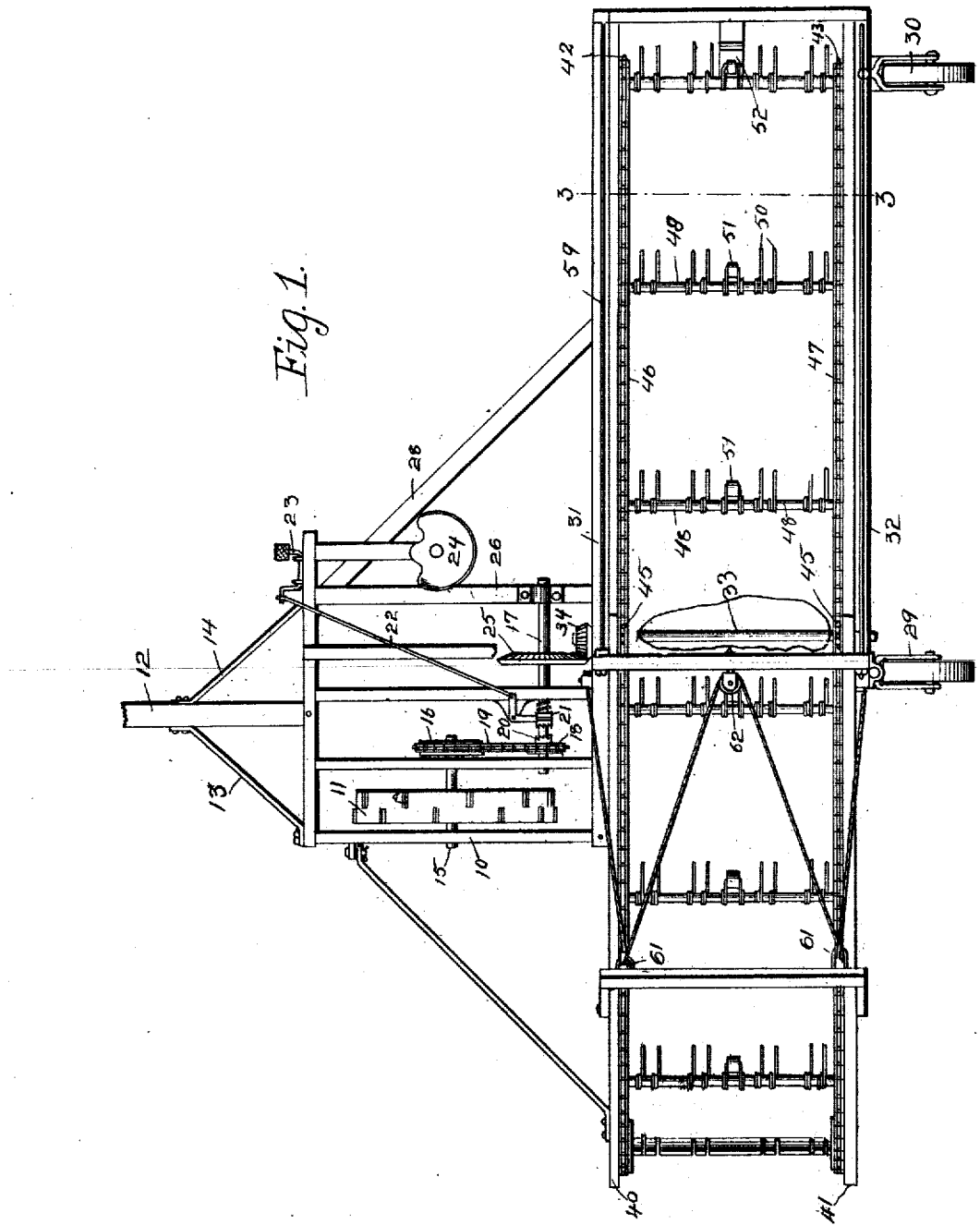

No. 811,745. PATENTED FEB. 6, 1906.
M. REW.
SIDE DELIVERY HAY RAKE AND LOADER.
APPLICATION FILED OCT. 17, 1904.

3 SHEETS—SHEET 1.

Witnesses
A. G. Hague
S. F. Christy.

Inventor, M. Rew
By Orwig & Lane
Attys

No. 811,745. PATENTED FEB. 6, 1906.
M. REW.
SIDE DELIVERY HAY RAKE AND LOADER.
APPLICATION FILED OCT. 17, 1904.
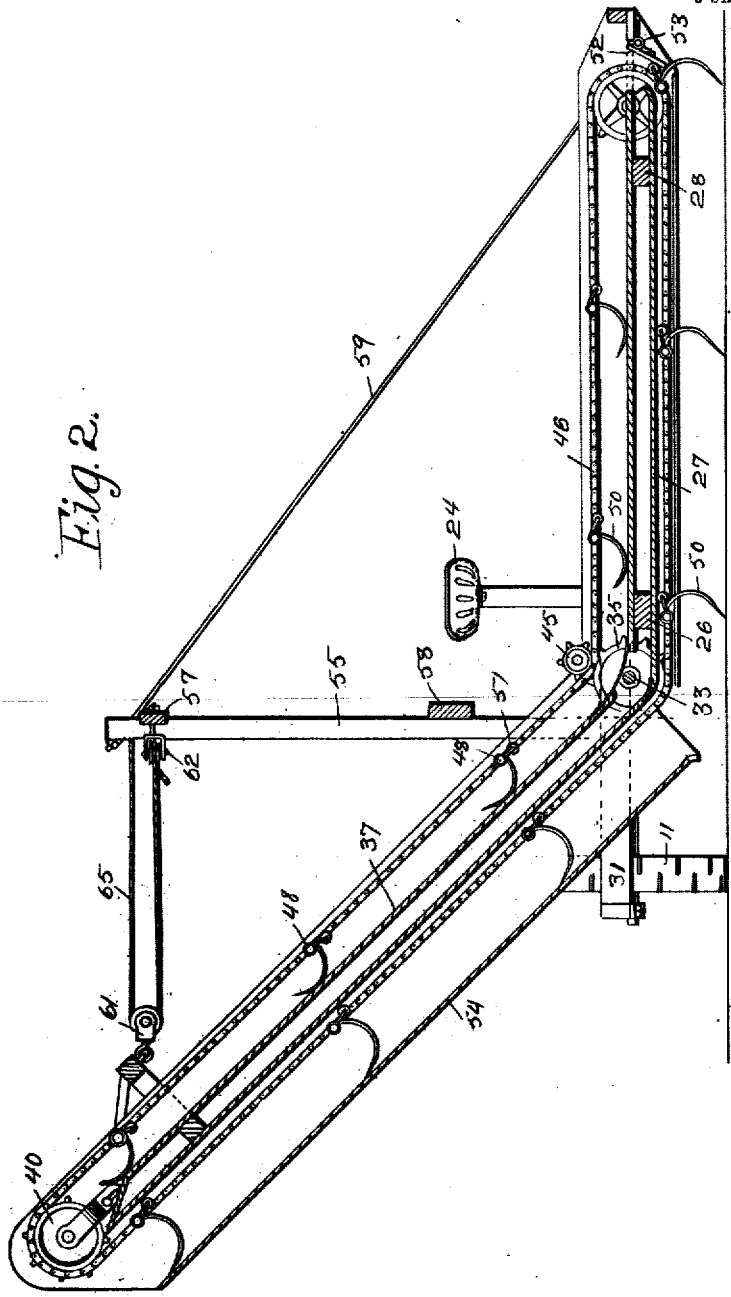

No. 811,745. PATENTED FEB. 6, 1906.
M. REW.
SIDE DELIVERY HAY RAKE AND LOADER.
APPLICATION FILED OCT. 17, 1904.
3 SHEETS—SHEET 3.
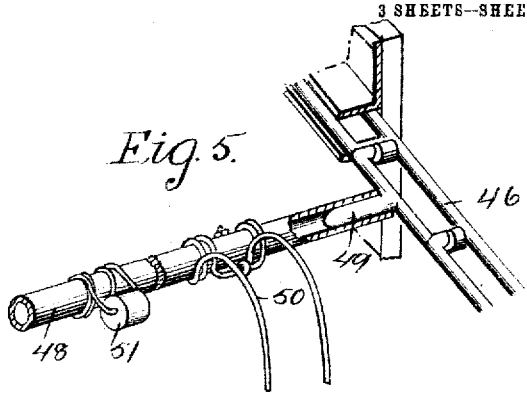
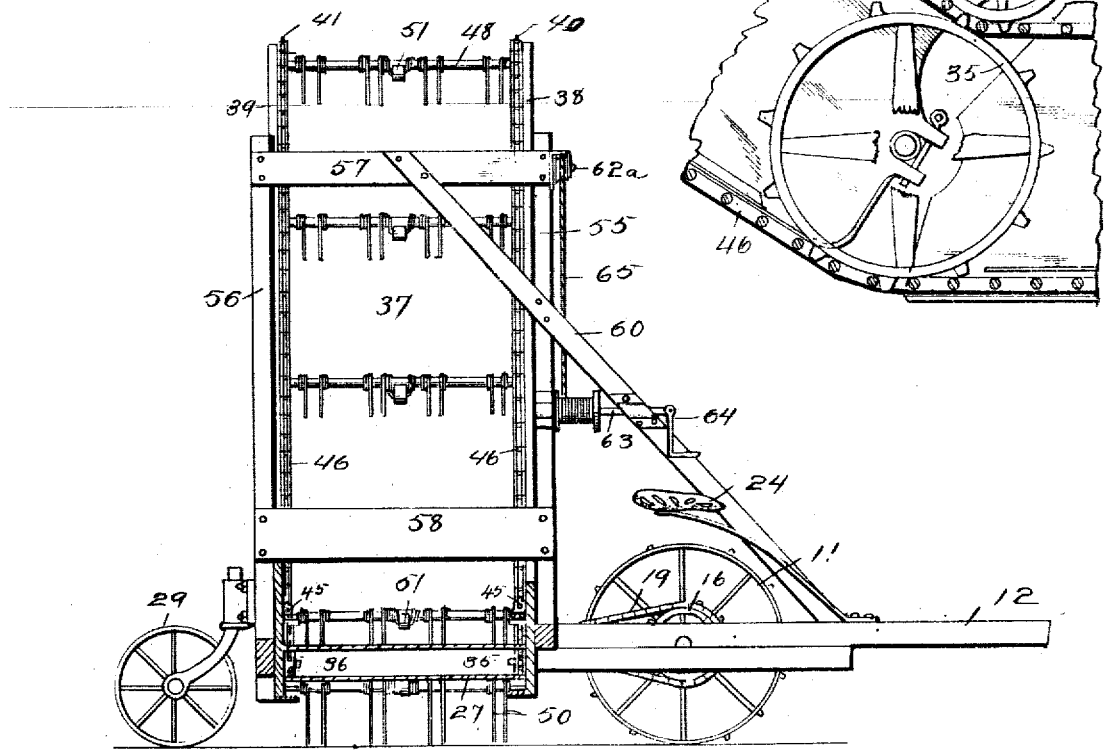

UNITED STATES PATENT OFFICE.

MADISON REW, OF GRINNELL, IOWA.

SIDE-DELIVERY HAY RAKE AND LOADER.

No. 811,745.

Specification of Letters Patent.

Patented Feb. 6, 1906.

Application filed October 17, 1904. Serial No. 228,792.

*To all whom it may concern:*

Be it known that I, MADISON REW, a citizen of the United States, residing at Grinnell, in the county of Poweshiek and State of Iowa, have invented a certain new and useful Side-Delivery Hay Rake and Loader, of which the following is a specification.

The objects of my invention are to provide a hay rake and loader of simple, durable, and inexpensive construction which will rake and elevate the hay by a single lateral conveyer operatively mounted on a loader-frame.

A further object is to provide a carrier for the elevating portion of the device the free end of which can be adjusted to various heights by the operator who is driving the draft-animals, without his moving from the driving-seat.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1 is a plan view of my device. Fig. 2 is a sectional view of the device cut through the conveyer and carrier frames upon which it is mounted. Fig. 3 is a cross-sectional view of the conveyer, taken on the line 3 3 of Fig. 1 looking toward the elevating portion of it. Fig. 4 is a detail view of two of the sprocket-wheels which form a part of the driving mechanism of the conveyer; and Fig. 5 is a detail view of one of the conveyer-chains, showing the way in which the teeth-supporting rod is connected with these chains.

Referring to the accompanying drawings, I have used the reference-numeral 10 to indicate the wheel-supporting frame having the traction-wheel 11 mounted at one side thereof. Attached to the forward end of this frame is the ordinary tongue 12, which is held rigidly in position by suitable braces 13 and 14. The traction-wheel 11 is mounted on the shaft 15, which has mounted on its inner end the sprocket-wheel 16. Extending across the inner end of the frame and rotatably mounted in it is the shaft 17, having the sprocket-wheel 18 adjacent to one end thereof, and immediately behind the sprocket-wheel 16. Passing around the sprocket-wheels 16 and 18 is a sprocket-chain 19, so that as the sprocket-wheel 16 is driven the sprocket-wheel 18 will be correspondingly driven. The sprocket-wheel 18 is loosely mounted on the shaft 17, and there is a ratchet-faced portion 20, against which a slidingly-mounted ratchet-faced member 21 is designed to be forced to throw the shaft 17 into or out of operation by means of the operating-lever 22, which is operatively connected with the pedal 23, which is within easy reach of the foot of the operator.

Mounted at the side of the wheel-supporting frame 10 and on the opposite side of it from the wheel 11 is the seat 24.

Fixed on the shaft 17 and to the right of the sprocket-wheel 20 is the beveled gear 25, which is in mesh with the mechanism for operating the conveyer to be hereinafter described. The side piece 26, which forms the extreme right side of the wheel-supporting frame 10, extends rearwardly a considerable distance from the rear side of the wheel-supporting frame 10. Mounted on this support is a lower carrier-frame 27, around which the conveyer is designed to travel. This lower carrier-frame 27 extends a considerable distance to the right of the side piece 26, and the extreme outer end of it (which is at the right side and slightly at the rear of the frame 10) is braced relative to the right side of the frame 10 by means of the brace 28. The rear side of the lower carrier-frame is supported by means of the swiveled casters 29 and 30 and the wheel 11. The entire mechanism is supported upon these caster-wheels 29 and 30 and the wheel 11. Extending through the sides 31 and 32 of the inner end of the lower carrier-frame 27 is the shaft 33, having the beveled gear 34 at its forward end in mesh with the beveled gear 25. Mounted on the shaft 33 are the sprocket-wheels 35 and 36, respectively, over and under which the chains forming the sides of the conveyer are designed to pass. Pivotally mounted on the shaft 33 is the upper carrier-frame 37, having the sides 38 and 39 therein, which are connected by a bottom of the carrier-frame 37, made of flooring and similar to the lower carrier-frame 27.

Rotatably mounted at the upper end of the side 38 of the upper carrier is an adjustably-mounted sprocket-wheel 40. Rotatably mounted at the upper end of the side 39 of the upper carrier is an adjustably-mounted sprocket-wheel 41. Rotatably mounted at the extreme outer end of the lower carrier 27 and connected with the sides 31 and 32, respectively, are the sprocket-wheels 42 and 43. Mounted a slight distance above the extreme inner upper portion of the sides 35 and 39 of the upper carrier-frame are two lugs 44, upon which two sprocket-wheels 45 are mounted. One of the sprocket-wheels 45 and the sprocket-wheel 35 are so mounted relative to each other that one of the chains for the conveyer can pass between them. The other of the sprocket-wheels 45 is so mounted relative to the sprocket-wheel 36 that the other chain of the conveyer passes between them, as hereinafter described. Passing around the sprocket-wheels 40, 35, and 42 is the sprocket-chain 46. Passing around the sprocket-wheels 41 and 36 and 43 and under the other of the sprocket-wheels 45 is a sprocket-chain 47. Connecting these sprocket-chains and at a certain distance away from each other are a series of shafts 48, which are capable of a rocking movement on the lugs 49, which support these shafts and are a part of some of the links of the chain. The way of mounting each of these shafts relative to the chain is clearly shown in Fig. 5 of the drawings. Firmly attached to each of the shafts 48 are a series of spring-teeth 50, which are preferably made in pairs, as shown clearly in Fig. 5 of the drawings. Connected with each of the shafts 48 and rotatably mounted a slight distance at one side of it is a roller 51, which is designed to coact with the carrier-frame in maintaining the shaft in position while the conveyer is being operated. The two chains 46 and 47, the series of shafts 48, the series of teeth 50, and the rollers 51 form what is termed for the sake of convenience the "conveyer." It will be seen that as the device is drawn forwardly over the ground-surface and the wheel 11 rotated and when the device is in gear that the shaft 17 will be rotated and cause the rotation of the beveled gear 25 and 34 and the rotation of the shaft 33, upon which the sprocket-wheels will drive the conveyer, inasmuch as this conveyer is held constantly in engagement with the sprocket-wheels 35 and 36 by means of the sprocket-wheels 45. At the extreme outer end of the lower carrier 27 I have provided a block 52, which is normally held in line with the platform of the lower conveyer by means of the spring-hinge 53. This block is designed to guide the rollers 51 in order to maintain the shafts 48 in the proper position as the conveyer is operated and is designed to bring the teeth into the proper position when they reach the under side of the lower conveyer, where they rake the hay as the conveyer is operated. It will be seen by a close examination of the drawings that the rollers 51 slide beneath the platform of the carriers when they are beneath this platform, and thus the teeth are prevented from being forced rearwardly by the resistance of the hay as the conveyer is being operated and the hay raked. Attached to the under side of the upper conveyer 37 is a trough 54, through which the hay is drawn after it is raked up in elevating it to the delivery end of the conveyer.

Extending upwardly from the inner end of the sides 31 and 32 of the lower carrier-frame are the posts 55 and 56. These posts are connected by the cross-pieces 57 and 58, which serve as braces to hold these posts in position relative to each other. Connecting the upper ends of these posts 55 and 56 with the outer ends of the sides 31 and 32 of the lower carrier-frame are the braces 59, designed to hold the posts 55 and 56 and support the delivery end of the conveyer. Connected with the upper portion of the upper carrier-frame 37 are two pulleys 61, one of which is at each side of the carrier-frame. Attached to the cross-piece 57 is the pulley 62. Mounted on the post 55 is the pulley 62$^a$. Rotatably mounted on the post 55 and the brace 60 is a windlass 63, having a pivoted crank 64 thereon. This crank normally hangs beneath the shaft upon which the windlass is mounted and by engaging the brace 60 maintains the windlass against rotation in one direction. When, however, it is desired to wind or unwind the windlass, the crank 64 is swung outwardly on its pivot, so that its lower end is out of engagement with the brace 60, and the windlass can be easily and readily wound or unwound by means of it and by the operator sitting on the seat 24. Attached at one end to the post 56, passed around one of the pulleys 61 and around the pulley 62 and then around the other pulley 61 and over the pulley 62$^a$, connected at its other end to the windlass 63, is a rope 65, which when wound or unwound upon the windlass 63 will raise or lower the outer end of the upper carrier-frame and will serve to support the outer end of said frame in the desired position.

In practical operation and assuming that the operative parts of my device are in gear, the driver is upon the seat, and the machine is being driven over the ground-surface, the conveyer will be driven and the hay will be raked by those teeth on the conveyer which are beneath the lower carrier-frame, and as these teeth move to the side and upwardly they will be maintained against the resistance of the hay in their operative position by means of the rollers 51 engaging the under surface of the platform of the carrier-frame until the hay is elevated through the trough 54 and delivered at the upper end of said trough and dropped onto the wagon or other vehicle which is to be driven parallel with my loader. When the hay has been delivered and the series of teeth on one of the shafts which supports them hangs beneath said shaft, as shown clearly in Fig. 2, until they reach the extreme outer end of the lower carrier-frame, where they move downwardly, and the shaft 48, engaging the block 52, will force the free end of the block downwardly, and as this is done the block will guide the roller 51 and hold it in position until it is engaged by the under surface of the platform of the inner carrier-frame. When the load is first started, the outer end of the upper conveyer is adjusted to a point slightly above the rack of the wagon or vehicle into which the hay is to be loaded, and as it increases in size the operator raises the outer end of said carrier by turning the crank 64 of the windlass. In transportation the upper carrier is raised to a very nearly vertical position and is maintained in that position by the windlass.

Having thus described my invention, what I claim, and desire to secure by Letters Patent of the United States therefor, is—

1. In a side-delivery hay rake and loader, a laterally and upwardly moving conveyer provided with means for raking the hay from the ground and elevating it to a point of discharge.

2. In a side-delivery hay rake and loader, a laterally and upwardly moving conveyer provided with means for raking the hay from the ground and elevating it to a point of discharge, and means for adjustably supporting the delivery end of the conveyer.

3. In a side-delivery hay rake and loader, a wheel-bearing frame, a laterally and upwardly moving conveyer mounted at the rear of said frame provided with means for gathering the hay from the ground and elevating it to a point of discharge, and means for supporting the rear side of the conveyer, for the purposes stated.

4. In a side-delivery hay rake and loader, a wheel-supported frame, a traction-wheel mounted therein, a laterally and upwardly moving conveyer provided with means for gathering the hay from the ground and elevating it to a point of discharge, and means for operatively connecting the conveyer with the traction-wheel.

5. In a side-delivery hay rake and loader, a wheel-supported frame, a traction-wheel mounted therein, a laterally and upwardly moving conveyer provided with means for gathering the hay from the ground and elevating it to a point of discharge, means for operatively connecting the conveyer with the traction-wheel, and means for varying the point of discharge of the conveyer.

6. In a side-delivery hay rake and loader, a wheel-supported frame, a traction-wheel mounted therein, a laterally and upwardly moving conveyer provided with means for gathering the hay from the ground and elevating it to a point of discharge, means for operatively connecting the conveyer with the traction-wheel, and means for tightening the conveyer on its supports.

7. In a side-delivery hay rake and loader, a wheel-supported frame, a traction-wheel mounted therein, a laterally and upwardly moving conveyer provided with means for gathering the hay from the ground and elevating it to a point of discharge, means for operatively connecting the conveyer with the traction-wheel, means for varying the point of discharge of the conveyer, and means for tightening the conveyer on its supports.

8. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame, and an endless conveyer provided with means for gathering the hay from the ground and elevating it laterally, supported by the upper and lower carrier-frames, for the purposes stated.

9. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame, an endless lateral conveyer supported by the upper and lower carrier-frames, comprising two endless chains connected by a series of rotatably-mounted shafts, a series of teeth mounted on each of said shafts, and a guide-roller designed to maintain the teeth in position as the carrier is operated for raking hay from the ground and elevating it laterally.

10. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame, an endless conveyer provided with means for raking and elevating hay laterally from the ground, supported by the upper and lower carrier-frames, and draft sprocket-wheels for operating said conveyer.

11. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame, an endless conveyer provided with means for raking and elevating hay laterally from the ground supported by the upper and lower carrier-frames, draft sprocket-wheels for operating said conveyer, and means for maintaining the conveyer in engagement with the sprocket-wheels.

12. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame an endless conveyer provided with means for raking hay from the ground and supported by the upper and lower carrier-frames, and a trough mounted beneath the upper carrier-section through which the hay is to be drawn by the conveyer in elevating it to a point of discharge.

13. In a side-delivery hay rake and loader, a frame, a traction-wheel in the frame, a lower carrier-frame at the rear of the frame, means for supporting the rear side of the lower carrier-frame, an upper carrier-frame pivoted at one end of said lower carrier-frame, means for supporting the free end of the upper carrier-frame, an endless conveyer supported by the upper and lower carrier-frames, teeth in the conveyer, a trough mounted beneath the upper carrier-section through which the hay is to be drawn by the teeth on the conveyer in elevating it to a point of discharge, and means for adjusting the free end of the upper carrier upwardly and downwardly, said means being within the reach of an operator sitting on the seat of the loader.

14. In a side-delivery hay rake and loader, two carrier-frames, a laterally and upwardly moving endless conveyer capable of gathering the hay from the ground and elevating it to a point of discharge, comprising two endless chains, a series of rocking shafts connecting these chains, a series of teeth mounted upon these shafts, and a guide-roller designed to coact with the carrier-frames around which the conveyer passes for maintaining the shafts against rocking movement as the teeth are raking and elevating hay.

15. In a side-delivery hay rake and loader, two carrier-frames, a laterally and upwardly moving endless conveyer capable of gathering the hay from the ground and elevating it to a point of discharge, comprising two endless chains, a series of rocking shafts connecting these chains, a series of teeth mounted upon these shafts, a guide-roller designed to coact with the carrier-frames around which the conveyer passes for maintaining the shafts against rocking movement as the teeth are raking and elevating hay, and means for adjustably supporting the delivery end of the elevating-conveyer.

MADISON REW.

Witnesses:
A. C. HARRIMAN,
J. S. MILLER.